(12) United States Patent
Tomaru et al.

(10) Patent No.: US 6,730,359 B2
(45) Date of Patent: May 4, 2004

(54) METHOD FOR COATING A RUNNING WEB USING A PLURALITY OF COATING LIQUIDS

(75) Inventors: Mikio Tomaru, Odawara (JP); Toshihiro Mandai, Odawara (JP); Hideaki Takekuma, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/125,046

(22) Filed: Apr. 19, 2002

(65) Prior Publication Data

US 2002/0164427 A1 Nov. 7, 2002

Related U.S. Application Data

(62) Division of application No. 09/886,129, filed on Jun. 22, 2001, now Pat. No. 6,548,117.

(30) Foreign Application Priority Data

Jun. 26, 2000 (JP) ........................................ 2000-191411
Jun. 26, 2000 (JP) ........................................ 2000-191412

(51) Int. Cl.[7] ................................................. B05D 1/36
(52) U.S. Cl. ........................ 427/356; 427/358; 427/402; 118/411
(58) Field of Search .................... 427/356, 358, 427/402; 118/410, 411

(56) References Cited

U.S. PATENT DOCUMENTS

| | | | | |
|---|---|---|---|---|
| 4,854,262 A | * | 8/1989 | Chino et al. | 118/411 |
| 5,518,773 A | * | 5/1996 | Shibata et al. | 427/356 |
| 5,670,214 A | * | 9/1997 | Saito et al. | 427/356 |
| 6,500,491 B2 | * | 12/2002 | Tomaru et al. | 427/402 |

FOREIGN PATENT DOCUMENTS

| | | |
|---|---|---|
| JP | 2-265672 | 10/1990 |
| JP | 6-134380 | 5/1994 |
| JP | 6-296917 | 10/1994 |
| JP | 2581975 | 11/1996 |
| JP | 2942938 | 6/1999 |
| JP | 2000-167474 | * 6/2000 |

* cited by examiner

Primary Examiner—Katherine A. Bareford
(74) Attorney, Agent, or Firm—Sughrue Mion, PLLC (57) ABSTRACT

In a case to coat a web by using coating heads which have plural slits, the coating method coats the web by adjusting a running speed, an average high shear viscosity, and a surface tension of the coating liquid of the top layer so that the capillary number Ca, which is calculated by an equation $Ca=U\mu/\sigma$, satisfies an inequality $0.1<Ca<4$, where U (m/s) is a running speed of the web, $\mu$ (Pa·s) is an average high shear viscosity of the coating liquids, and $\sigma$ (N/m) is a surface tension of the coating liquid for the top layer.

2 Claims, 10 Drawing Sheets

| | COATING SPEED (m/s) | BOTTOM LAYER | TOP LAYER | THICKNESS OF BOTTOM LAYER($\mu$m) | THICKNESS OF TOP LAYER($\mu$m) | AVERAGE HIGH SHEAR VISCOSITY (Pa·sec) | Ca NUMBER | SURFACE QUALITY |
|---|---|---|---|---|---|---|---|---|
| CONDITION 1 | 1.0 | B1 | A4 | 10.0 | 1.5 | $32.6 \times 10^{-3}$ | 1.6 | G |
| CONDITION 2 | 2.0 | B1 | A4 | 10.0 | 1.5 | $32.6 \times 10^{-3}$ | 3.1 | G |
| CONDITION 3 | 3.0 | B1 | A4 | 10.0 | 1.5 | $32.6 \times 10^{-3}$ | 4.7 | F |
| CONDITION 4 | 4.0 | B1 | A4 | 10.0 | 1.5 | $32.6 \times 10^{-3}$ | 6.2 | F |
| CONDITION 5 | 4.0 | B1 | A3 | 10.0 | 1.5 | $32.5 \times 10^{-3}$ | 4.6 | F |
| CONDITION 6 | 4.0 | B1 | A2 | 10.0 | 1.5 | $32.5 \times 10^{-3}$ | 4.2 | F |
| CONDITION 7 | 4.0 | B1 | A1 | 10.0 | 1.5 | $32.5 \times 10^{-3}$ | 3.8 | G |
| CONDITION 8 | 6.0 | B2 | A5 | 5.0 | 1.5 | $17.2 \times 10^{-3}$ | 3.7 | G |
| CONDITION 9 | 6.0 | B2 | A6 | 5.0 | 1.5 | $17.7 \times 10^{-3}$ | 3.8 | G |
| CONDITION 10 | 6.0 | B2 | A7 | 5.0 | 1.5 | $20.0 \times 10^{-3}$ | 4.3 | F |
| CONDITION 11 | 1.0 | B5 | A5 | 10.0 | 1.5 | $4.0 \times 10^{-3}$ | 0.5 | G |
| CONDITION 12 | 0.2 | B5 | A5 | 10.0 | 1.5 | $4.0 \times 10^{-3}$ | 0.1 | F |

F I G. 7

| | COATING SPEED (m/s) | BOTTOM LAYER | MIDDLE LAYER | TOP LAYER | THICKNESS OF BOTTOM LAYER($\mu$m) | THICKNESS OF MIDDLE LAYER($\mu$m) | THICKNESS OF TOP LAYER($\mu$m) | AVERAGE HIGH SHEAR ISCOSITY (Pa·sec) | Ca NUMBER | SURFACE QUALITY |
|---|---|---|---|---|---|---|---|---|---|---|
| CONDITION13 | 1.0 | B1 | A4 | A5 | 9.0 | 1.5 | 0.5 | $31.2 \times 10^{-3}$ | 1.1 | G |
| CONDITION14 | 2.0 | B1 | A4 | A5 | 9.0 | 1.5 | 0.5 | $31.2 \times 10^{-3}$ | 2.2 | G |
| CONDITION15 | 3.0 | B1 | A4 | A5 | 9.0 | 1.5 | 0.5 | $31.2 \times 10^{-3}$ | 3.4 | G |
| CONDITION16 | 4.0 | B1 | A4 | A5 | 9.0 | 1.5 | 0.5 | $31.2 \times 10^{-3}$ | 4.5 | F |
| CONDITION17 | 0.08 | B1 | A4 | A5 | 9.0 | 1.5 | 0.5 | $31.2 \times 10^{-3}$ | 0.09 | F |

FIG. 8

| | BOTTOM LAYER | TOP LAYER | $\mu_{BOTTOM} - \mu_{TOP}$ (Pa·sec) | LIMIT OF THINNESS OF TOP LAYER ($\mu m$) | EVALUATION |
|---|---|---|---|---|---|
| CONDITION18 | B11 | A9 | $7.9 \times 10^{-3}$ | 5.0 | F |
| CONDITION19 | B11 | A10 | $6.2 \times 10^{-3}$ | 2.1 | F |
| CONDITION20 | B11 | A11 | $3.6 \times 10^{-3}$ | 0.3 | E |
| CONDITION21 | B11 | A12 | $2.2 \times 10^{-3}$ | 0.3 | E |
| CONDITION22 | B11 | A13 | $0.9 \times 10^{-3}$ | 0.3 | E |
| CONDITION23 | B11 | A14 | $0.2 \times 10^{-3}$ | 0.2 | E |
| CONDITION24 | B11 | A15 | $-3.9 \times 10^{-3}$ | 0. | E |
| CONDITION25 | B11 | A16 | $-5.1 \times 10^{-3}$ | 0. | E |
| CONDITION26 | B11 | A17 | $-7.7 \times 10^{-3}$ | 0. | E |
| CONDITION27 | B11 | A18 | $-10.7 \times 10^{-3}$ | 0.2 | E |
| CONDITION28 | B11 | A19 | $-14.1 \times 10^{-3}$ | 0.2 | E |
| CONDITION29 | B11 | A20 | $-20.4 \times 10^{-3}$ | 1.9 | F |
| CONDITION30 | B11 | A21 | $-26.1 \times 10^{-3}$ | 3.6 | F |
| CONDITION31 | B6 | A12 | $-6.0 \times 10^{-3}$ | 0.2 | E |
| CONDITION32 | B7 | A12 | $-4.7 \times 10^{-3}$ | 0. | E |
| CONDITION33 | B8 | A12 | $-2.1 \times 10^{-3}$ | 0.1 | E |
| CONDITION34 | B9 | A12 | $-0.2 \times 10^{-3}$ | 0.1 | E |
| CONDITION35 | B10 | A12 | $1.3 \times 10^{-3}$ | 0.3 | E |
| CONDITION36 | B12 | A12 | $5.8 \times 10^{-3}$ | 1.9 | F |
| CONDITION37 | B13 | A12 | $7.1 \times 10^{-3}$ | 3.8 | F |
| CONDITION38 | B13 | A17 | $-2.8 \times 10^{-3}$ | 0. | E |
| CONDITION39 | B14 | A18 | $-2.7 \times 10^{-3}$ | 0. | E |
| CONDITION40 | B15 | A19 | $-3.9 \times 10^{-3}$ | 0.7 | G |
| CONDITION41 | B16 | A20 | $-4.3 \times 10^{-3}$ | 0.9 | G |

F I G. 9

| | TOP LAYER | $\mu_{MIDDLE} - \mu_{TOP}$ (Pa·sec) | LIMIT OF THINNESS OF TOP LAYER ($\mu$m) | EVALUATION |
|---|---|---|---|---|
| CONDITION42 | B7 | $6.7 \times 10^{-3}$ | 5.0 | F |
| CONDITION43 | B9 | $2.2 \times 10^{-3}$ | 0.3 | E |
| CONDITION44 | B11 | $-0.2 \times 10^{-3}$ | 0.3 | E |
| CONDITION45 | B15 | $-10.4 \times 10^{-3}$ | 0.3 | E |
| CONDITION46 | B16 | $-16.3 \times 10^{-3}$ | 2.1 | F |

F I G. 1 0

| | BOTTOM LAYER | MIDDLE LAYER | $\mu_{BOTTOM} - \mu_{MIDDLE}$ (Pa·sec) | $\mu_{MIDDLE} - \mu_{TOP}$ (Pa·sec) | LIMIT OF THINNESS OF MIDDLE LAYER | EVALUATION |
|---|---|---|---|---|---|---|
| CONDITION47 | B11 | B7 | $6.9 \times 10^{-3}$ | $-14.6 \times 10^{-3}$ | 5.0 | F |
| CONDITION48 | B11 | B8 | $4.3 \times 10^{-3}$ | $-12.0 \times 10^{-3}$ | 0.8 | E |
| CONDITION49 | B11 | B15 | $-10.2 \times 10^{-3}$ | $2.5 \times 10^{-3}$ | 0.3 | E |
| CONDITION50 | B11 | B16 | $-16.1 \times 10^{-3}$ | $8.4 \times 10^{-3}$ | 3.2 | F |
| CONDITION51 | B12 | B7 | $10.5 \times 10^{-3}$ | $-14.6 \times 10^{-3}$ | 3.8 | F |
| CONDITION52 | B12 | B8 | $7.9 \times 10^{-3}$ | $-12.0 \times 10^{-3}$ | 2.4 | F |
| CONDITION53 | B12 | B15 | $-6.6 \times 10^{-3}$ | $2.5 \times 10^{-3}$ | 0.1 | E |
| CONDITION54 | B12 | B16 | $-12.5 \times 10^{-3}$ | $8.4 \times 10^{-3}$ | 2.8 | F |

METHOD FOR COATING A RUNNING WEB USING A PLURALITY OF COATING LIQUIDS

This is a divisional of application Ser. No. 09/886,129 filed Jun. 22, 2001, now U.S. Pat. No. 6,548,117; the disclosure of which is incorporated herein by reference.

BACKGROUND OF THE INVENTION

1. Field of the Invention

The present invention relates to a coating method and a coated product, particularly to a coating method and a coated product which have applications for coating a web with thin uniform layers at a high speed.

2. Description of the Related Art

Necessities for coating a web with thin uniform layers at a high speed have been arisen in order to follow improved functions and qualities of recent magnetic recording medium, photosensitive material, electronic material, coated battery, optical film for preventing reflection, polishing tape, data recording paper, and so forth.

To present a specific example, in manufacturing of a magnetic record medium, magnetic layers have been developed to be thinner and multiplied in order to follow larger scales of media. Specially, needs for making magnetic recording layers have been dramatically increased due to spread of a magnetic head such as an MR head which has a high sensitivity, and thus a coating method is required for forming an extremely thin film of a magnetic recording layer with thickness of between 0.02 $\mu$m and 0.2 $\mu$m in a dry state (between 0.2 $\mu$m and 2 $\mu$m in a wet state). Since the surface of the magnetic layer of this type requires an extremely high flatness, a conventional coating method attempts to improve capability of the magnetic recording layer by providing a non-magnetic coating layer with thickness of between 0.2 $\mu$m and 3 $\mu$m as a bottom layer of the magnetic recording layer (a layer next to web) so that projections over the surface of the web are flattened. In view of the above points in terms of productivity in manufacturing the magnetic recording layer, it is important whether or not the extremely thin magnetic recording layer and other layers can be formed on the web uniformly at a high speed.

Methods and apparatuses for forming the magnetic recording layer with thickness of 0.5 $\mu$m or less at the dry state have been suggested in prior arts such as Japanese Patent No. 2581975 and Japanese Patent Application Laid-open No. 6-296917. Those coating methods and apparatuses use a method for applying and forming two coating layers at the same time in which the air is prevented from being mixed with the layers by applying a non-magnetic bottom layer in a suitable amount; hence the methods and apparatuses can form the magnetic recording layer of the top layers with thickness of 2 $\mu$m in the wet state.

Further, the coating methods and apparatuses disclosed in the prior arts such as Japanese Patent No. 2942938 suggests a coating method in which the coating liquid for the bottom layer in low viscosity is applied on the web beforehand, and the coating liquid for the magnetic recording layer is applied by preventing mixture of the air with the layers while removing a part of the coating liquid for the bottom layer.

Yet a problem remains in which streaks with an equal pitch occur on the surface of the magnetic recording layer when the thickness of the coating layer for the magnetic recording layer is made to be 0.2 $\mu$m or less (2 $\mu$m or less at the wet state), even though the above-mentioned conventional coating methods and apparatuses are used. The streaks cause lowering capability of the magnetic recording layer as a product.

The fact is not limited to application of the magnetic recording layer. In application for layers other than for manufacturing the magnetic recording layer, the streaks with the equal pitch occur when applying multiple layers of two or more layers by applying an upper layer before the coating liquid for a lower layer is dried, so-called a wet-on-wet manner, especially when the thickness of layers other than the bottom layer is made to be 2 $\mu$m or less.

In view of the above, a coating method is desired by which the thickness of the multiple coating layers is 2 $\mu$m or less, or preferably 1 $\mu$m or less at the wet state but the streaks with the equal pitch still do not occur.

SUMMARY OF THE INVENTION

The present invention has been developed in view of the above-described circumstances, and has as its object the provision of a coating method and a coated product which can prevent the streaks from occurring on the surface of the coating layers even though the coating layers, particularly the layers that are formed by multiple layer coating with the thickness of 2.0 $\mu$m or less, or preferably 1.0 $\mu$m or less at the wet state, are formed by a high speed coating.

In order to achieve the above-described objects, the present invention is directed to a coating method in which a web which continuously runs is relatively pressed against an edge face of a coating head and a plurality of coating liquids are discharged from a plurality of slits formed in the edge face in a direction of width of the web so that layers of the coating liquids are formed on the web, wherein: a capillary number Ca which is calculated by an equation Ca=U$\mu$/$\sigma$ satisfies an inequality 0.1<Ca<4, where U (m/s) is a running speed of the web, $\mu$ (Pa·s) is an average high shear viscosity of the coating liquids, and $\sigma$ (N/m) is a surface tension of the coating liquid for a top layer of the layers.

In order to achieve the above-described objects, the present invention is also directed to a coating method in which a coating liquid is oversupplied to a web which continuously runs to form a bottom layer and then the web is relatively pressed against an edge face of a coating head and one or more of coating liquids are discharged from one or more of slits formed in the edge face in a direction of width of the web while an upper stream side of the edge face removes a part of the bottom layer when the coating liquid of the bottom layer is wet so that one or more of coating layers are formed on the bottom layer, wherein: a capillary number Ca which is calculated by an equation Ca=U$\mu$/$\sigma$ satisfies an inequality 0.1<Ca<4, where U (m/s) is a running speed of the web, $\mu$ (Pa·s) is an average high shear viscosity of the one or more of coating liquids, and $\sigma$ (N/m) is a surface tension of the coating liquid for a top layer of the layers.

Moreover, in order to achieve the above-described objects, the present invention is also directed to coated products produced in accordance with the above-described methods.

According to the present invention, the coated product manufactured by the coating method can have a thin coating layer with the thickness of 2.0 $\mu$m or less in the wet state and the coating layer does not have the streaks of the equal pitch, resulting in that capability of the magnetic recording layer, which is the coated product, can be dramatically improved if the coating layer is the magnetic recording layer, for example.

Moreover, in order to achieve the above-described objects, the present invention is also directed to a coating method in which a web which continuously runs is relatively pressed against an edge face of a coating head and a plurality of shear thinning coating liquids are discharged from a plurality of slits formed in the edge face in a direction of width of the web so that layers of the plurality of coating liquids are applied on the web in a wet-on-wet condition, wherein: viscosities of the plurality of coating liquids are adjusted so that a following inequality is satisfied, $$-15 \times 10^{-3} < \mu_{n-1} - \mu_n < 5 \times 10^{-3},$$

where $\mu_n$ (Pa·s) is a high shear viscosity of the coating liquid forming an n-th (n≧2) layer from the web and $\mu_{n-1}$ (Pa·s) is a high shear viscosity of the coating liquid forming an (n−1)-th layer that is adjacent to the n-th layer.

The present invention is also directed to a coating method in which a shear thinning coating liquid is oversupplied to a web which continuously runs to form a bottom layer and then the web is relatively pressed against an edge face of a coating head and one or more of shear thinning coating liquids are discharged from one or more slits formed in the edge face in a direction of width of the web while an upper stream side of the edge face removes a part of the bottom layer when the coating liquid of the bottom layer is wet so that one or more of coating layers are formed on the bottom layer in a wet-on-wet condition, wherein: viscosities of the coating liquids are adjusted so that a following inequality is satisfied, $$-15 \times 10^{-3} < \mu_{n-1} - \mu_n < 5 \times 10^{-3},$$

where $\mu_n$ (Pa·s) is a high shear viscosity of the coating liquid forming an n-th (n≧2) layer from the web and $\mu_{n-1}$ t (Pa·s) is a high shear viscosity of the coating liquid forming an (n−1)-th layer that is adjacent to the n-th layer.

The present invention is also directed to coated products produced in accordance with the above-described methods.

According to the present invention, the coated product manufactured by the coating method can have a thin coating layer with the thickness of 1 $\mu$m or less in the wet state and the coating layer does not have the streaks of the equal pitch, resulting in that capability of the magnetic recording layer, which is the coated product, can be dramatically improved if the coating layer is the magnetic recording layer, for example.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereunder preferred embodiments will be described in detail of a coating method and a coated product in accordance with the accompanying drawings.

Figure 1:
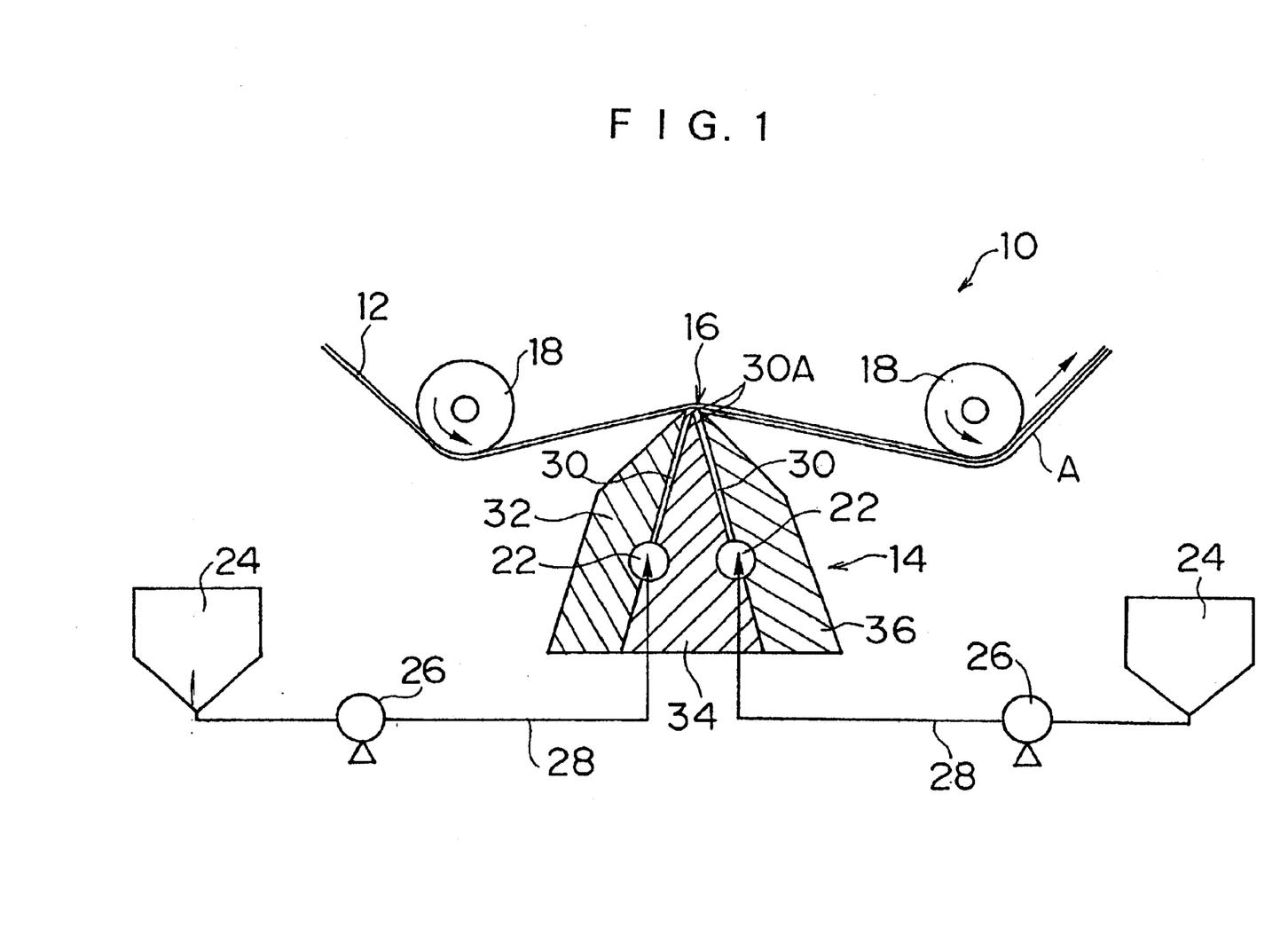
FIG. 1 is a view showing an entire structure of an example of a coating apparatus to which a coating method of the present invention is applied.

FIG. 1 is a view showing an entire structure of an example of a coating apparatus of an extrusion type to which a coating method of the present invention is applied. The example in FIG. 1 shows a case where two types of shear thinning coating liquids are applied in multiple layers on a web by one coating head with plural slits (two slits are shown in FIG. 1). If the coating layer to be formed is a magnetic recording layer, the coating liquid may be two different magnetic coating liquids; however, the coating liquid for the bottom layer (a layer adjacent to the web) should be a non-magnetic coating liquid or may be a coating liquid with low viscosity which is used for precoating.

As seen from FIG. 1, a coating apparatus 10 mainly comprises a web 12 which continuously runs, a coating head 14 for applying the coating liquid on the web 12, and a pair of guide rollers 18 and 18 which are respectively provided at the upstream and downstream of the running direction of the web so as to face each other, and which guide the web continuously running. The coating liquid is applied on the web 12 in a state that the web 12 and an edge face 16 of the coating head 14 are pressed against each other.

Two cylindrical pockets 22 and 22 which are parallel with a direction of the width of the web 12 are formed in the coating head 14, and the pockets 22 and 22 are connected with tanks 24 and 24 for storing the two types of coating liquids via liquid supply pumps 26 and 26 by pipes 28 and 28. By this structure, each of the coating liquids is supplied from each of the tanks 24 and 24 to the respective pockets 22 and 22, and is diverged into a width corresponding with a coating width. The two types of coating liquids each of which is being spread at each of the pockets 22 and 22 go up in each of slits 30 and 30, and are discharged from each of slit mouths 30A and 30A which are formed on the edge face 16.

Figure 2:
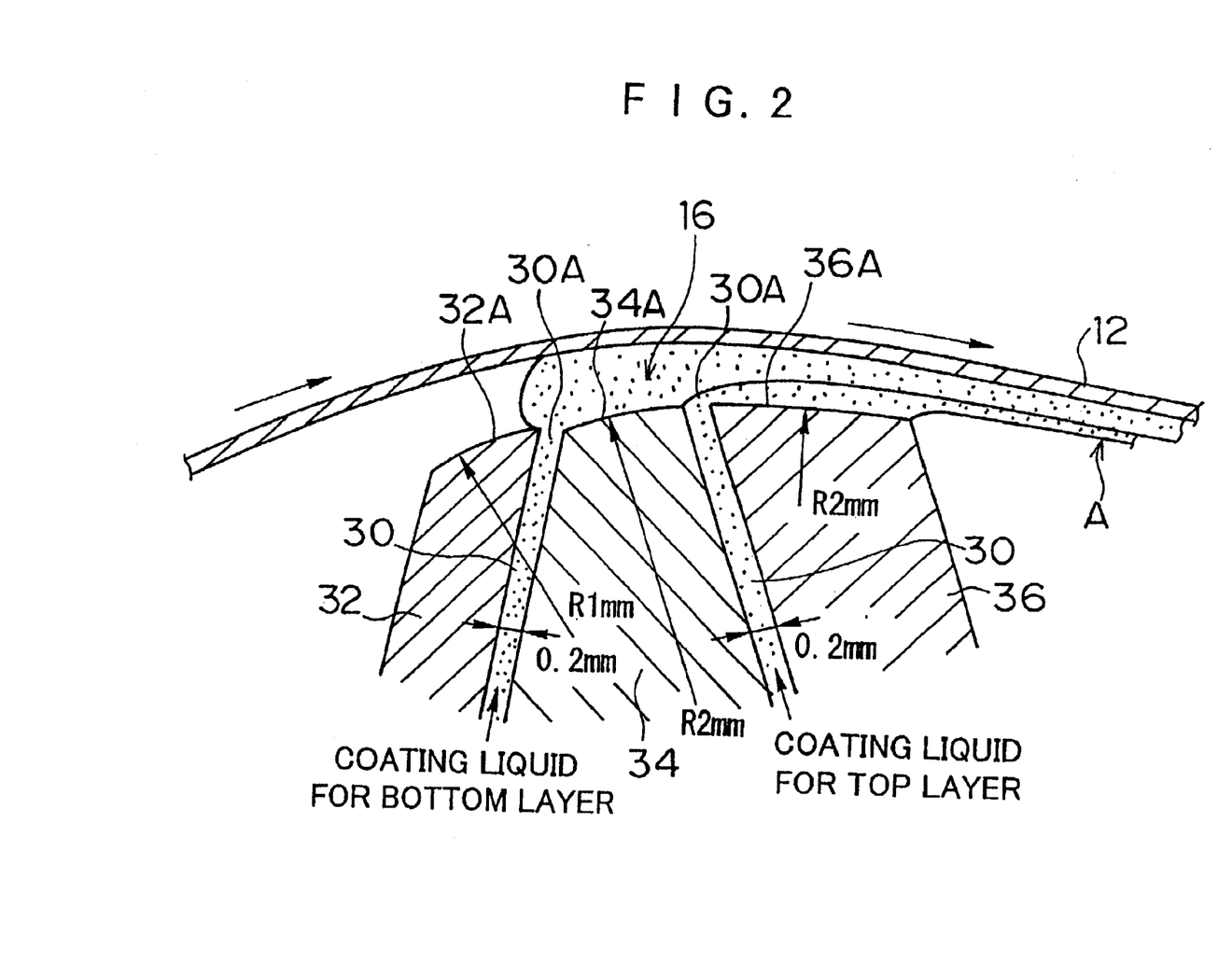
FIG. 2 is a view illustrating a provision of the coating apparatus which coats web by a single coating head with two slits.

FIG. 2 is an enlarged view of the top end of the coating head 14. In FIG. 2, the coating head is constructed with three blocks 32, 34, and 36 sandwiching the two slits 30 and 30, and the edge face 16 is constructed with a front edge face 32A, a doctor edge face 34A for the bottom layer, and a doctor edge face 36A for the top layer corresponding with the blocks 32, 34, and 36, respectively, in view of the running direction of the web. The front edge face 32A is formed to have a length (a length in the running direction of the web) of between 0.1 mm and 30 mm, and may be formed to be flat or formed in an arch with a certain curvature. The doctor edge faces 34A and 34A for the bottom and the top layers are formed to have a length (a length in the running direction of the web) of between 0.5 mm and 20 mm, and may be formed in an arch with a certain curvature or formed to have a combination of the arch and B the flat face. The slit 30 is formed to have the width of normally between 0.03 mm and 2 mm. In an example in FIG. 2, the coating head 14 is constructed in that the front edge face 32A has a curvature R1 mm, the doctor edge faces 34A and 36A for the bottom and the top layers have curvature R2 mm, and the width of the slit is 0.2 mm.

The coating liquid for the bottom layer (the coating liquid which will form the bottom layer) is discharged from the slit 30 at the upstream side in the running direction of the web, and the coating liquid for the top layer (the coating liquid which will form the top layer) is discharged from the slit 30 at the downstream side in the running direction of the web, so that a coating layer A comprising the top and the bottom layers is formed on the web 12. In that case, a clearance is formed between the web 12 and the front edge face 32A at the upstream side of the running direction of the web of the coating head 14, and the coating liquid for the top layer is applied in a state that the coating liquid for the bottom layer is flooded. A merit in flooding the coating liquid for the bottom layer is that the air accompanied with the web 12 is prevented from being mixed in the layer when applying the coating liquid for the bottom layer in an extremely thin layer, and at the same time the web is not shaved off due to contact of the front edge with the web 12.

Figure 3:
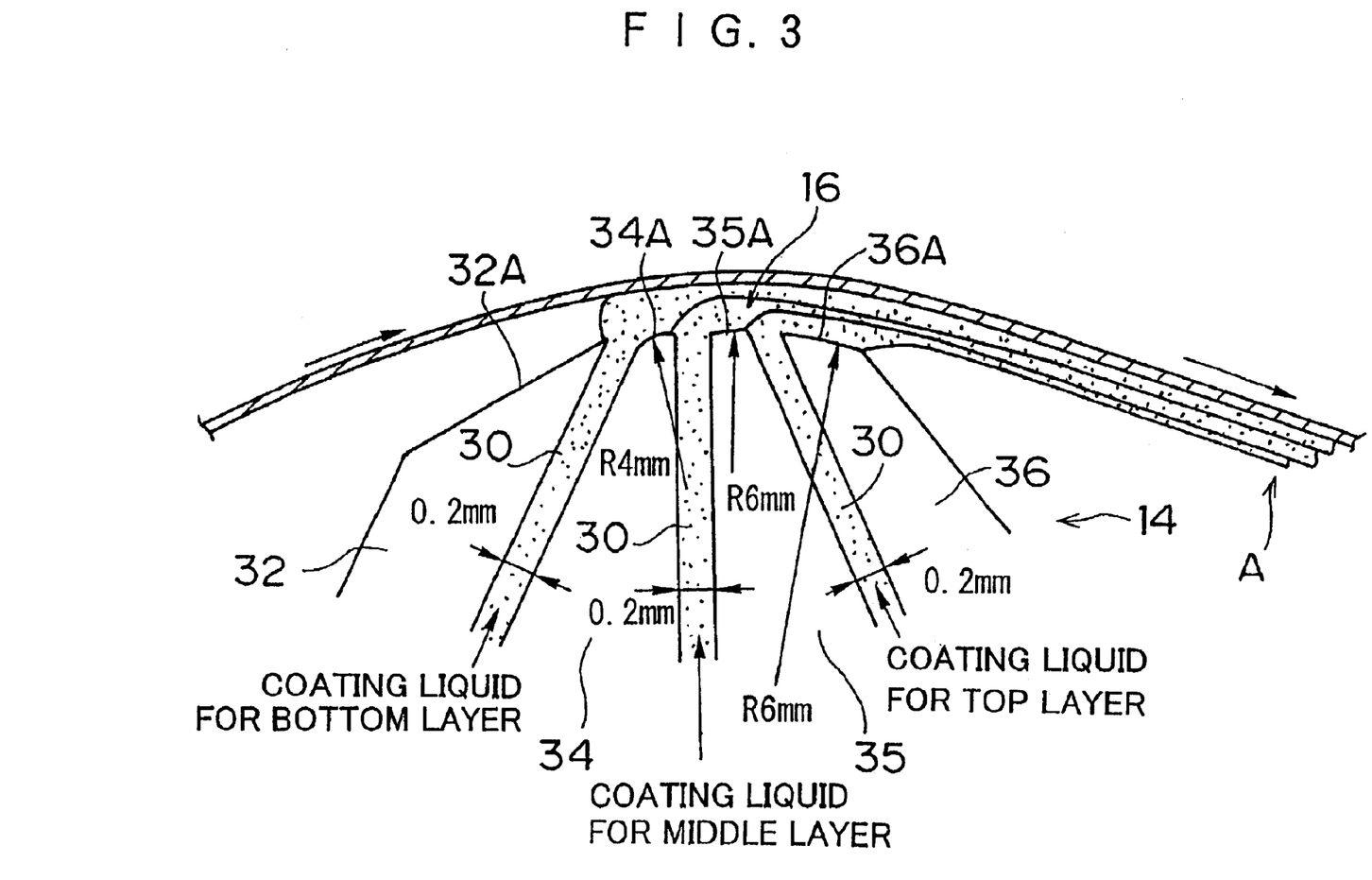
FIG. 3 is another view illustrating a provision of the coating apparatus which coats the web by a single coating head with three slits.

FIG. 3 is an enlarged view of the top end of the coating head 14 with three slits. The coating head 14 is constructed with the four blocks that are the blocks 32, 34, 35, and a block 36 sandwiching the three slits 30, and the edge face 16 is constructed with the front edge face 32A, the doctor edge face 34A for the bottom layer, a doctor edge face 35A for the middle layer, and the doctor edge face 36A for the top layer corresponding with the blocks 32, 34, 35, and 36, respectively in view of the running direction of the web 12. Preferable length, surface form, and slit width of the edge faces 32A, 34A, 35A, and 36A are the same as those described for FIG. 2. In an example of FIG. 3, the coating head is constructed in that the front edge face 32A is flat, the doctor edge face 34A has a curvature of R4 mm, the doctor edge faces 35A and 36A for the middle and the top layers have a curvature R6 mm, and the width of the slits is 0.2 mm.

Figure 4:
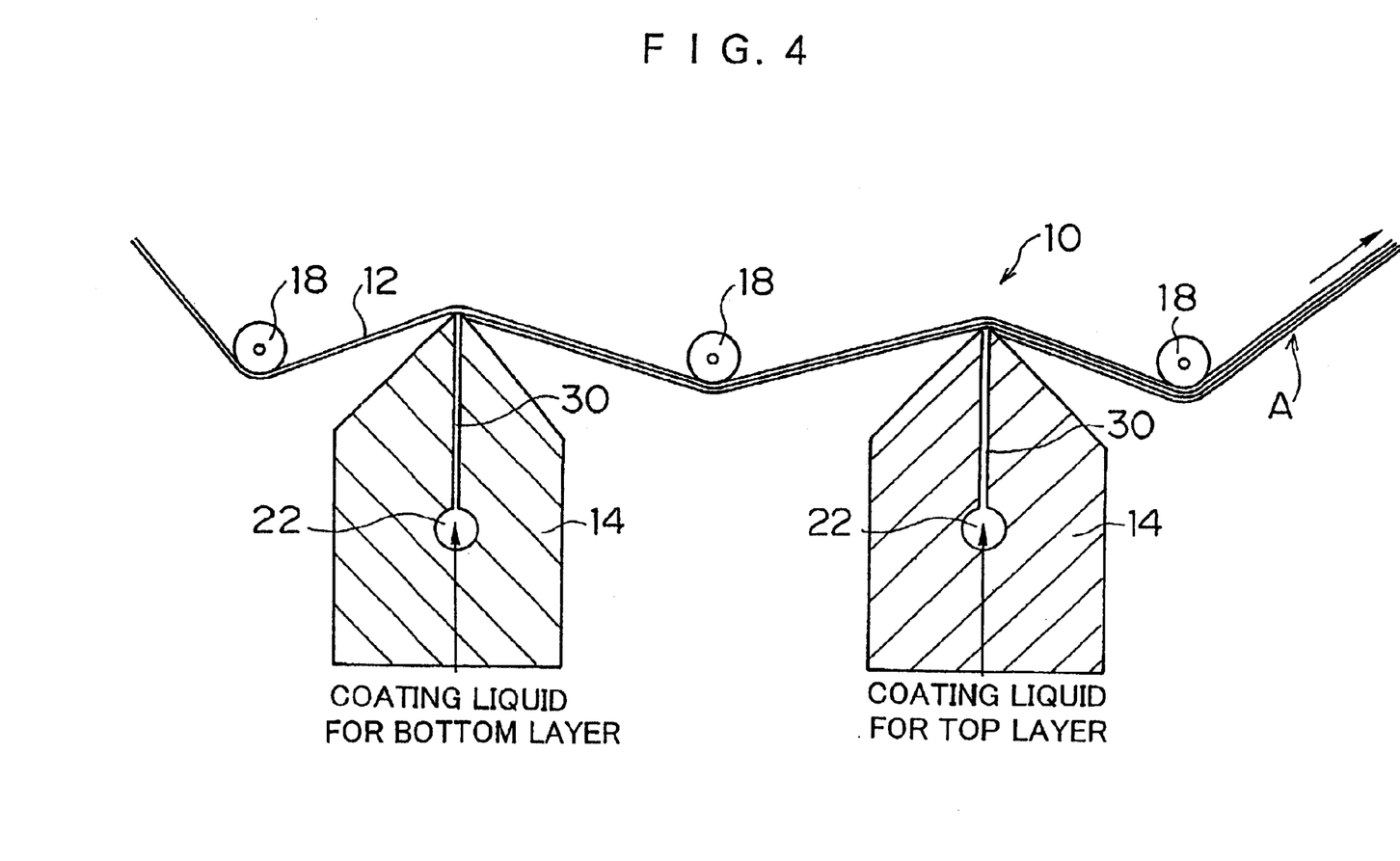
FIG. 4 is an explanatory view for the coating apparatus which coats the web with multiple layers by using a plurality of coating heads.

As the coating apparatus to which the coating method according to the present invention is applied, the coating apparatus 10 can be used which performs multilayer coating as described above by discharging the different kinds of coating liquids from the plurality of slits 30 formed on the single coating head 14 (refer to Japanese Patent No. 2581975, Japanese Patent Publication No. 6-49171 and Japanese Patent No. 2935148), and also the coating apparatus 10 shown in FIG. 4 can be used which performs multilayer coating by discharging the coating liquids from the slits 30 and 30 of the plurality of coating heads 14, respectively, and stacking the coating liquids while the under coating liquid is still wet (refer to Japanese Patent No. 2646265).

Figure 5:
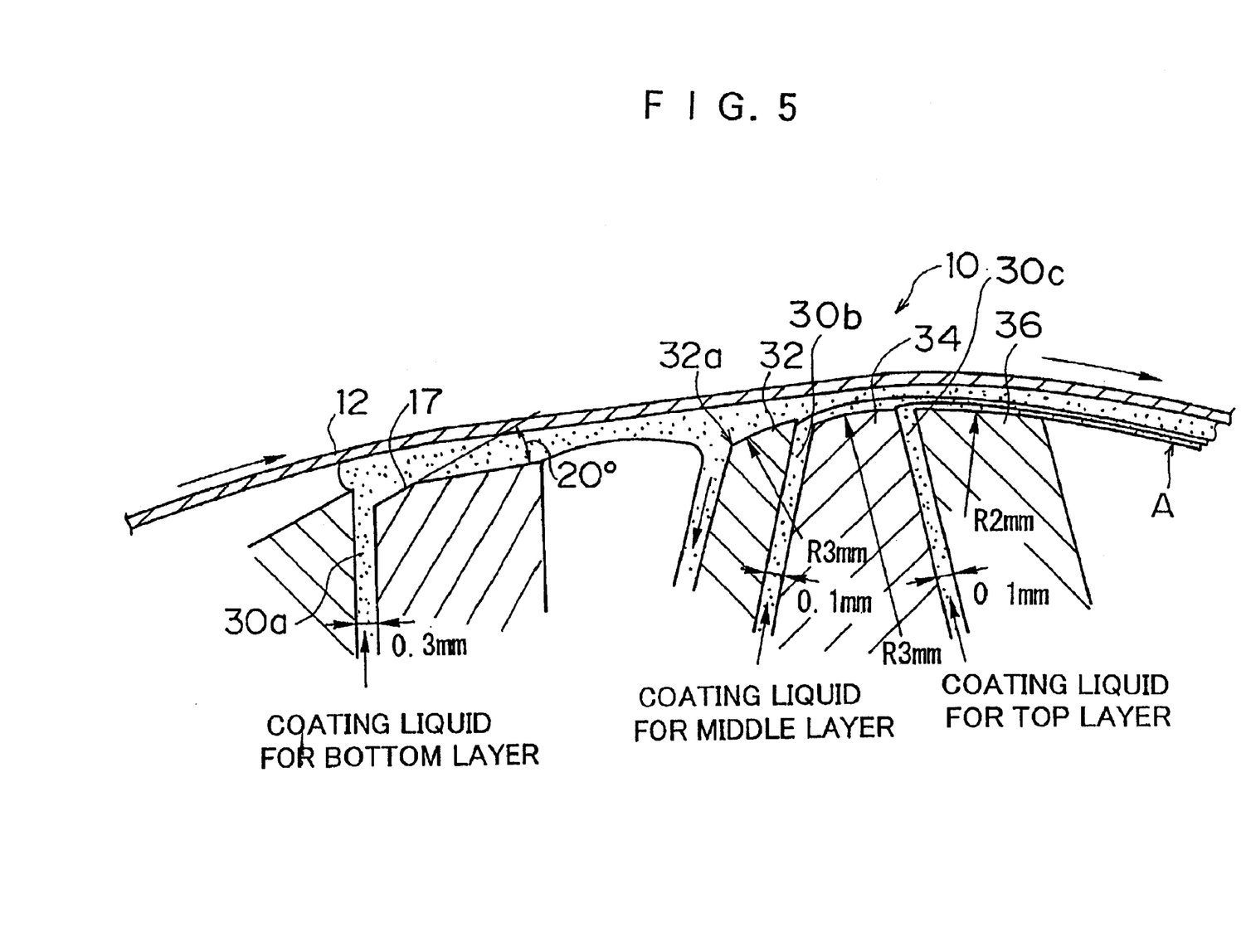
FIG. 5 is a view illustrating a provision of the coating apparatus which applies a coating liquid of a bottom layer on a coated surface of the web beforehand, and then applies a coating liquid of a middle layer and a top layer in multiple layers while removing a part of the coating liquid of the bottom layer.

Further, as seen from FIG. 5, the coating apparatus 10 may be used in which the coating liquid for the bottom layer is discharged from a slit 30a for the coating liquid for the bottom layer which is positioned at the upstream of the web 12 which runs continuously, and the bottom layer is formed on the coating layer of the web 12 beforehand, then the coating liquids for the middle layer and the top layer are discharged from slits 30b and 30c for the coating liquids for the middle layer and the top layer and at the same time a part of the bottom layer is removed by a front edge 32a at downstream while the bottom layer is wet, so as to apply the middle layer and the top layer over the bottom layer (disclosed in Japanese Patent Nos. 2684486 and 2601367). In the case of using the coating apparatus, a coating head for the coating liquid for the bottom layer and another coating head for the coating liquids for the middle layer and the top layer may be provided separated. However, if the coating heads are combined into a single coating head, the apparatus can be compact in size; also, the single coating head is suitable for applying in a wet-on-wet manner in which the coating liquids for the middle layer and the top layer are applied over the bottom layer while the coating liquid for the bottom layer applied beforehand is still wet. In the example of FIG. 4, the coating head 14 is formed in that a width is 0.3 mm of the slit 30a for the coating liquid for the bottom layer, a tapering angle is 20 degree of an end 17 of the edge face at upstream of the slit 30a for the coating liquid for the bottom layer, the front edge face of a coating head 14a for the coating liquids for the middle and the top layers has a curvature R3 mm, and the doctor edge face for the middle layer has a curvature R3 mm, the doctor edge face for the top layer has a curvature R2 mm, and a width of the slit is 0.1 mm.

However, in all the cases described above, the coating apparatus 10 has a problem in that streaks with equal pitches occur on the surface of the coating layer A when coating is attempted to make the top layer and/or the middle layer except the bottom layer of the coating layer A comprising multiple layers to have a thickness of 0.2 $\mu$m (2 $\mu$m or less in the wet state) by coating in the conventional coating method.

After thorough studies to find a cause of the streaks with equal pitch, the streaks with equal pitch were found to be caused by an unstable phenomenon which occurs over a free surface at the downstream of the running direction of the web of the coating head 14, and also the phenomenon is severely affected by a capillary number of the entire coating liquid.

The coating method of the present invention is developed in view of the above-described findings. According to the coating method of the present invention, in a case for coating multiple layers on the web by the coating heads with plural slits, or in a case for forming a bottom layer by oversupplying the coating liquid for the bottom layer to the coated face of the web and removing a part of the coating liquid of the bottom layer while the coating liquid of the bottom layer is wet, then piling up the coating liquids in one or more layers so as to apply the plural layers, the method applies the layers by adjusting the running speed, the average high shear viscosity of the plural types of coating liquids, and the surface tension of the coating liquid of the top layer, so that the capillary number Ca, which is calculated by the following equation 1, satisfies an inequality 0.1<Ca<4, $$Ca = U\mu/\sigma, \quad \text{(equation 1)}$$

where U (m/s) is a running speed of the web, $\mu$ (Pa·s) is an average high shear viscosity of the plural types of coating liquids, and $\sigma$ (N/m) is a surface tension of the top layer of the plural coating layers.

An average high shear viscosity is a measure which is obtained by first measuring a viscosity of coating liquids forming the respective layers in a shearing speed of 1000 sec$^{-1}$ by use of a high shear viscosity measurer and next weighting the viscosity with a desired thickness of the respective layer to be formed so as to calculate an average viscosity. More specifically, in a multiple coating in the wet-on-wet manner for coating at the same time a coating liquid A in a thickness of $X_A$ ($\mu$m), a coating liquid B in a thickness of $X_B$ ($\mu$m), and a coating liquid C in a thickness of $X_C$ ($\mu$m), where a viscosity of the liquid A is $\mu_A$, a viscosity of the liquid B is $\mu_B$, and a viscosity of the liquid C is $\mu_C$: an average high shear viscosity $\mu_{AVE}$ is defined by the following equation 2, $$\mu_{AVE}=(X_A\mu_A+X_B\mu_B+X_C\mu_C)/(X_A+X_B+X_C). \quad \text{(equation 2)}$$

The surface tension σ (N/m) of the coating liquid for the top layer which is measured is a surface tension of a solution in which a macromolecular binder, a solvent, a lubricant, and a surfactant each of which molecular weight is 1000 or less are mixed in the coating liquid.

By applying the coating method of the present invention to the coating apparatus 10 which is constructed as described above, the thickness of the top layer and/or the middle layer except the bottom layer can be thin as to 2 $\mu$m or less at the wet state, and at the same time the streaks with the equal pitch can be prevented from occurring over the surface of the coating layer A even though the coating is performed at the high speed. Since the coating capability is improved as such, the coating method and the coated product of the present invention improves the quality of the product as well as its productivity.

The coated product which is manufactured by the so-called wet-on-wet manner in the coating method of the present invention, particularly the one having the thickness of at least one of the multiple coating layers as 2 $\mu$m or less in the wet state can perform superior capability. For example, if the layer is a magnetic recording layer, capability of the magnetic recording layer which is the product can be apparently improved.

After thorough studies to find a cause of the streaks with equal pitch, a fact was found out that the occurrence of the streaks with equal pitch depends on a difference in viscosity of the coating liquids which form the adjacent layers of the multiple coating layers on the web 12 at the time of applying high shearing.

The coating method of the present invention is developed in view of the above-described findings. According to the coating method of the present invention, in a case for coating the web with multiple layers by the coating heads with plural slits, or in a case for forming the bottom layer by oversupplying the coating liquid for the bottom layer to the coated face of the web and removing a part of the coating liquid of the bottom layer while the coating liquid of the bottom layer is wet, then applying the multiple layers (wet-on-wet manner), the method applies the layers by adjusting the respective viscosity of the plural types of coating liquid so as to satisfy "the viscosity condition of the present invention" that is represented with the following inequality 3, $$-15\times10^{-3} \text{ (Pa·s)}<\mu_{n-1}-\mu_n<5\times10^{-3} \text{ (Pa·s)}, \quad \text{(inequality 3)}$$

where $\mu_n$ is a high shear viscosity (Pa·s) of the coating liquid forming an n-th (n≧2) layer from the coated face of the web among the multiple coating layers, and $\mu_{n-1}$ is a high shear viscosity (Pa·s) of the coating liquid forming the layer adjacent to the n-th layer at the web side.

Moreover, the viscosity of the coating liquid for the first layer, which is the nearest to the coated face of the web, is adjusted preferably to satisfy the following inequality 4, $$\mu_1<20\times10^{-3} \text{ (Pa·s)}, \quad \text{(inequality 4)}$$

where $\mu_1$ is a high shear viscosity (Pa·s) of the coating liquid for the first layer which forms the first layer adjacent to the web among the multiple coating layers.

The high shear viscosity originally means a viscosity of the coating liquid at the time of applying the high shearing which the coating liquid receives between the top end of the coating head 14 and the web 12. However, the shearing speed at the normal high shearing is extremely high such as between tens of thousands $\sec^{-1}$ to a few million $\sec^{-1}$; hence, the high shear viscosity in the present specification is defined by the viscosity of the coating liquids at the shearing speed of 10000 $\sec^{-1}$.

By applying the coating method of the present invention to the coating apparatus 10 which is constructed as described above, the thickness of the top layer and/or the middle layer except the bottom layer can be thin as to 1 $\mu$m or less at the wet state, and at the same time the streaks with the equal pitch can be prevented from occurring over the surface of the coating layer A even though the coating is performed at the high speed. Since the coating capability is improved as such, the coating method and the coated product of the present invention improves the quality of the product as well as productivity.

The coated product which is manufactured by the so-called wet-on-wet manner in the coating method of the present invention, particularly the one having the thickness of at least one of the multiple coating layers as 1 $\mu$m or less at the wet state can perform superior 30 capability. For example, if the layer is a magnetic recording layer, capability of the magnetic recording layer which is the product can be apparently improved.

In the coating method of the present invention, the coating speed of between 30 m/min and 1500 m/min is normally used, but the coating speed is not limited to the range. In view of stabilizing running of the web 12 and uniformizing the pressing of the coating head 14, the web 12 is run preferably at a tension of between 50 N per meter and 500 N per meter, and the tension is preferably adjusted in accordance with coating conditions. A distance between the guide roller 18 and the coating head 14 is set preferably at between 50 mm and 300 mm. The guide roller 18 and/or the coating head 14 are preferably movable so that an entering angle and a leaving angle of the web 12 with respect to the coating head 14 are adjustable in accordance with the coating conditions. Moreover, if the web 12 has a low rigidity, the guide roller 18 is preferably selected from rollers such as an expander roller, a crown roller and a concave roller in order to prevent unevenness.

The web 12 may be a plastic film which is made of polyethylene terephthalate (PET), polyethylene-2,6-naphthalate, cellulose diacetate, cellulose triacetate, cellulose acetate propionate, polyvinyl chloride (PVC), polyvinylidene chloride, polycarbonate, polyimide, polyamide, and so forth, or the web 12 may be a film made of paper or laminated paper, or a metal film made of aluminum or copper, or further a film made of glass or ceramics; but the material for the film is not limited to the above-mentioned one.

A typical size of the web 12 is between 0.1 m and 3 m in width, between 1000 m and 100000 m in length, and between 0.5 $\mu$m and 100 $\mu$m in thickness; but the size is not limited to that. Moreover, an undercoat layer such as an adhesion layer which is dried and cured, or another functional layer may be provided to the web 12 beforehand.

EXAMPLES

A method for preparing the coating liquids for the following experiments was as follows.

In Examples 1 and 2, an original coating liquid A composed of the contents shown in Table 1 was kneaded by a kneader and dispersed by using a sandmill, and the liquid thereby obtained was filtrated by using a filter having holes of average size of 1 μm, then proper amounts of methyl ethyl ketone, toluene, butyl acetate, stearic acid, and butyl stearate were added; as a result the coating liquids A1–A8 for the top layer were obtained. The high shear viscosity and the surface tension of the coating liquids A1–A8 for the top layer are shown in Table 2.

TABLE 1

Composition of Original Coating Liquid A

| | | Parts by Weight |
|---|---|---|
| Ferromagnetism Metal Particle | Composition: Fe/Zn/Ni = 92/4/4 Average Axis Length: 0.08 μm, Acicular Ratio: 8 He 2000 Oe | 100 Parts |
| Vinyl Chloride Polymer | Number Average Molecular Weight: 20000 | 20 Parts |
| Cyclohexanone | | 100 Parts |

TABLE 2

| | High Shear Viscosity (Pa · s) | Surface Tension (N/m) |
|---|---|---|
| Coating Liquid A1 | $16.0 \times 10^{-3}$ | $34.5 \times 10^{-3}$ |
| Coating Liquid A2 | $16.2 \times 10^{-3}$ | $31.3 \times 10^{-3}$ |
| Coating Liquid A3 | $16.1 \times 10^{-3}$ | $27.8 \times 10^{-3}$ |
| Coating Liquid A4 | $16.5 \times 10^{-3}$ | $21.0 \times 10^{-3}$ |
| Coating Liquid A5 | $7.4 \times 10^{-3}$ | $27.8 \times 10^{-3}$ |
| Coating Liquid A6 | $10.3 \times 10^{-3}$ | $27.8 \times 10^{-3}$ |
| Coating Liquid A7 | $23.7 \times 10^{-3}$ | $27.8 \times 10^{-3}$ |
| Coating Liquid A8 | $31.3 \times 10^{-3}$ | $27.8 \times 10^{-3}$ |

Further, an original coating liquid B composed of the contents shown in Table 3 was kneaded by a kneader and dispersed by using a sandmill, and the liquid thereby obtained was filtrated by using a filter having holes of average size of 1 μm, then proper amounts of methyl ethyl ketone, toluene, butyl acetate, stearic acid, and butyl stearate were added; as a result the coating liquids B1–B5 for the bottom layer were obtained. The high shear viscosity of the coating liquids B1–B5 for the bottom layer is shown in Table 4.

TABLE 3

Composition of Original Coating Liquid B

| | | Parts by Weight |
|---|---|---|
| Non-Organic Particle | TiO$_2$ Average Particle Size: 0.035 μm | 100 Parts |
| Polyester Urethane Resin | Number Average Molecular Weight: 7000 | 20 Parts |
| Cyclohexanone | | 100 Parts |

TABLE 4

| | High Shear Viscosity (Pa · s) |
|---|---|
| Coating Liquid B1 | $35.0 \times 10^{-3}$ |
| Coating Liquid B2 | $19.2 \times 10^{-3}$ |
| Coating Liquid B3 | $13.2 \times 10^{-3}$ |

TABLE 4-continued

| | High Shear Viscosity (Pa · s) |
|---|---|
| Coating Liquid B4 | $9.5 \times 10^{-3}$ |
| Coating Liquid B5 | $3.4 \times 10^{-3}$ |

In Examples 3, 4, and 5, the original coating liquid A composed of the contents shown in Table 1 was kneaded by the kneader and dispersed by using the sandmill, and the liquid thereby obtained was filtrated by using the filter having holes of average size of 1 μm, then a proper amount of methyl ethyl ketone was added; as a result the coating liquids A9–A21 were obtained. The high shear viscosity of the coating liquids A9–A21 are shown in Table 5.

TABLE 5

| | High Shear Viscosity (Pa · s) |
|---|---|
| Coating Liquid A9 | $2.5 \times 10^{-3}$ |
| Coating Liquid A10 | $4.2 \times 10^{-3}$ |
| Coating Liquid A11 | $6.8 \times 10^{-3}$ |
| Coating Liquid A12 | $8.2 \times 10^{-3}$ |
| Coating Liquid A13 | $9.5 \times 10^{-3}$ |
| Coating Liquid A14 | $10.2 \times 10^{-3}$ |
| Coating Liquid A15 | $14.3 \times 10^{-3}$ |
| Coating Liquid A16 | $15.5 \times 10^{-3}$ |
| Coating Liquid A17 | $18.1 \times 10^{-3}$ |
| Coating Liquid A18 | $21.1 \times 10^{-3}$ |
| Coating Liquid A19 | $24.5 \times 10^{-3}$ |
| Coating Liquid A20 | $30.8 \times 10^{-3}$ |
| Coating Liquid A21 | $36.5 \times 10^{-3}$ |

Further, the original coating liquid B composed of the contents shown in Table 3 was kneaded by the kneader and dispersed by using the sandmill, and the liquid thereby obtained was filtrated by using the filter having holes of average size of 1 μm, then a proper amount of methyl ethyl ketone was added; as a result the coating liquids B6–B18 were obtained. The high shear viscosity of the coating liquids B6–B18 is shown in Table 6.

TABLE 6

| | High Shear Viscosity (Pa · s) |
|---|---|
| Coating Liquid B6 | $2.2 \times 10^{-3}$ |
| Coating Liquid B7 | $3.5 \times 10^{-3}$ |
| Coating Liquid B8 | $6.1 \times 10^{-3}$ |
| Coating Liquid B9 | $8.0 \times 10^{-3}$ |
| Coating Liquid B10 | $9.5 \times 10^{-3}$ |
| Coating Liquid B11 | $10.4 \times 10^{-3}$ |
| Coating Liquid B12 | $14.0 \times 10^{-3}$ |
| Coating Liquid B13 | $15.3 \times 10^{-3}$ |
| Coating Liquid B14 | $18.4 \times 10^{-3}$ |
| Coating Liquid B15 | $20.6 \times 10^{-3}$ |
| Coating Liquid B16 | $26.5 \times 10^{-3}$ |
| Coating Liquid B17 | $30.9 \times 10^{-3}$ |
| Coating Liquid B18 | $37.1 \times 10^{-3}$ |

Example 1

Two types of coating liquids were used in which one of the coating liquids for the top layer in Table 2 and one of the coating liquids for the bottom layer in Table 4 were combined, and the coating apparatus in FIG. 2 provided with the single coating head with two slits was used. The coating apparatus applied multiple layers on the web made of polyethylene terephthalate with the thickness of 6 μm by changing coating conditions such as coating speed, types of coating liquids, and thickness of coating. Presence of streaks with the equal pitch on the surface of the coating layer at that time was evaluated.

Figure 6:
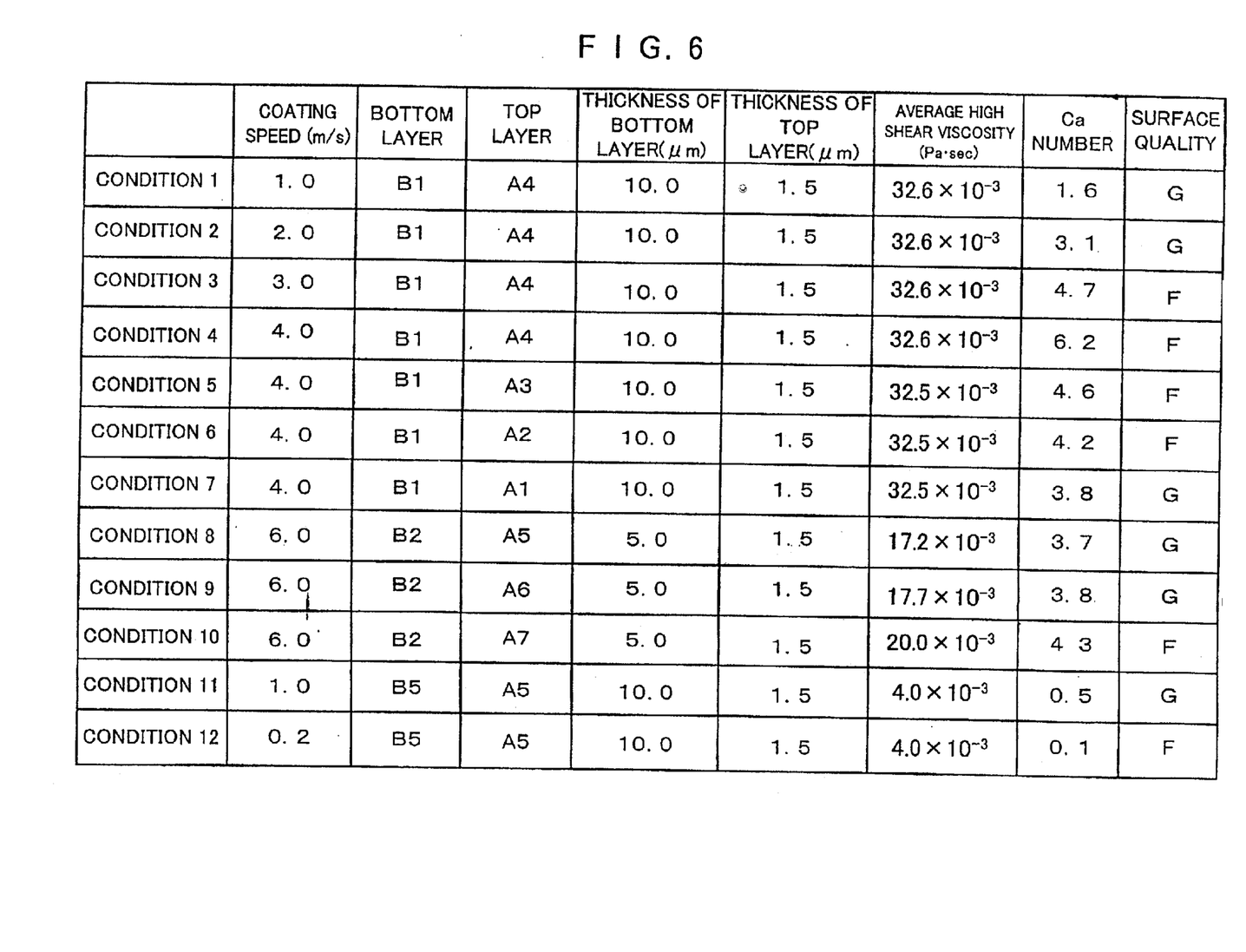
FIG. 6 is a table representing a result of the first example.

The coating conditions and the results of evaluation are shown in FIG. 6. In surface quality in FIG. 6, "G" means that the quality was good without the streaks with the equal pitch, H and "F" means that the quality was failure with the presence of the streaks and unevenness.

As seen from FIG. 6, the surface quality of the coating layers was good in the following experimental sections, Condition 1 (Ca number=1.6), Condition 2 (Ca number= 3.1), Condition 7 (Ca number=3.8), Condition 8 (Ca number=3.7), Condition 9 (Ca number=3.8), and Condition 11 (Ca number=0.5), in which the capillary numbers satisfied the inequality 0.1<Ca<4.

In contrast, the surface quality in the coating layers was failure with the presence of streaks and unevenness in the following experimental sections, Condition 12 (Ca number= 0.1) in which the capillary number Ca was less than the minimum value 0.1, and Condition 3 (Ca number=4.7), Condition 4 (Ca number=6.2), Condition 5 (Ca number= 4.6), Condition 6 (Ca number=4.2), and Condition 10 (Ca number=4.3) in which the capillary number Ca was over the maximum value 4.0.

Example 2

Three types of coating liquids were used in which the coating liquid A4 in Table 2 was used as for the middle layer in addition to the coating liquid A5 for the top layer in Table 2 and the coating liquid B1 for the bottom layer in Table 4, and the coating apparatus in FIG. 5 was used that first applied and formed the bottom layer on the coated face of the web, and then applied the coating liquids for the middle layer and the top layers while removing a part of the bottom layer in the wet state. The coating apparatus applied multiple layers on the web made of polyamide with the thickness of 3.5 $\mu$m by changing the coating conditions such as coating speed, types of coating liquids, and thickness of coating. Presence of streaks with the equal pitch on the surface of the coating layers was evaluated.

Figure 7:
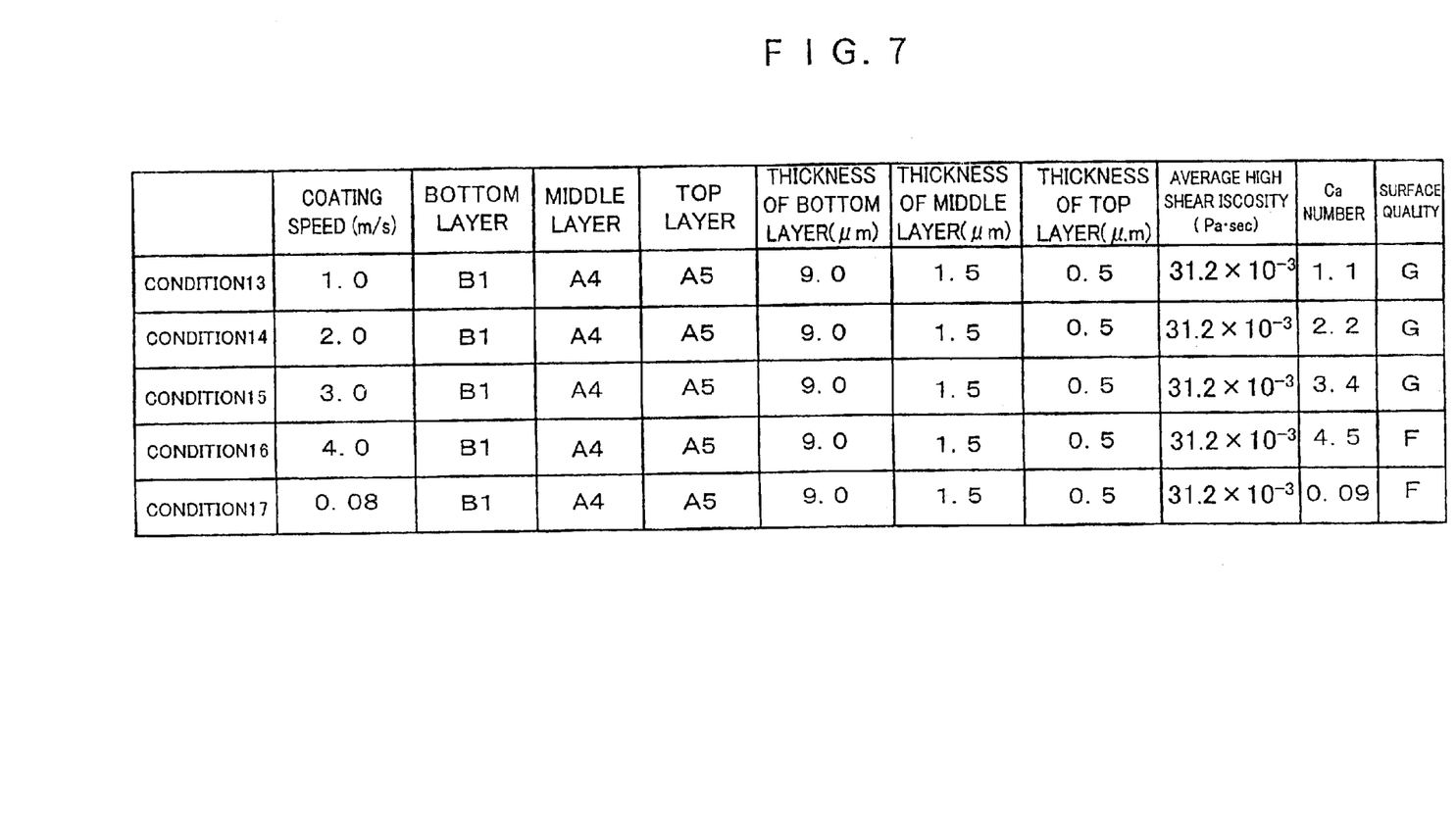
FIG. 7 is a table representing a result of the second example.

The coating conditions and the results of the evaluation are shown in FIG. 7. In surface quality in FIG. 7, "G" means that the quality was good without the streaks with the equal pitch, and "F" means that the quality was failure with the presence of the streaks and unevenness.

As seen from FIG. 7, the surface quality of the coating layers was good in the following experimental sections, Condition 13 (Ca number=1.1), Condition 14 (Ca number= 2.2), and Condition 15 (Ca number=3.4), in which the capillary number satisfied the inequality 0.1<Ca<4.

In contrast, the surface quality in the coating layers was failure with the presence of streaks and unevenness in the following experimental sections, Condition 17 (Ca number= 0.09) in which the capillary number was less than the minimum value 0.1, and Condition 16 (Ca number=4.5) in which the capillary number Ca was over the maximum value 4.0.

Example 3

Two types of coating liquids were used in which one of the coating liquids in Table 5 and one of the coating liquids in Table 6 were combined, and the coating apparatus in FIG. 2 provided with the single coating head with two slits was used. The coating apparatus applied two layers (bottom and top layers) at the coating speed of 600 m/minute on the web made of polyethylene terephthalate with the thickness of 16 $\mu$m. The thickness of the bottom layer at that time was fixed at 6 $\mu$m (in the wet state), while the top layer was gradually made thinner. A relationship was evaluated between a thickness of the top layer (in the wet state) where the streaks with the equal pitch were about to occur and a difference in viscosity of the coating liquids for the top layer and the bottom layer at the time of applying the high shearing.

Figure 8:
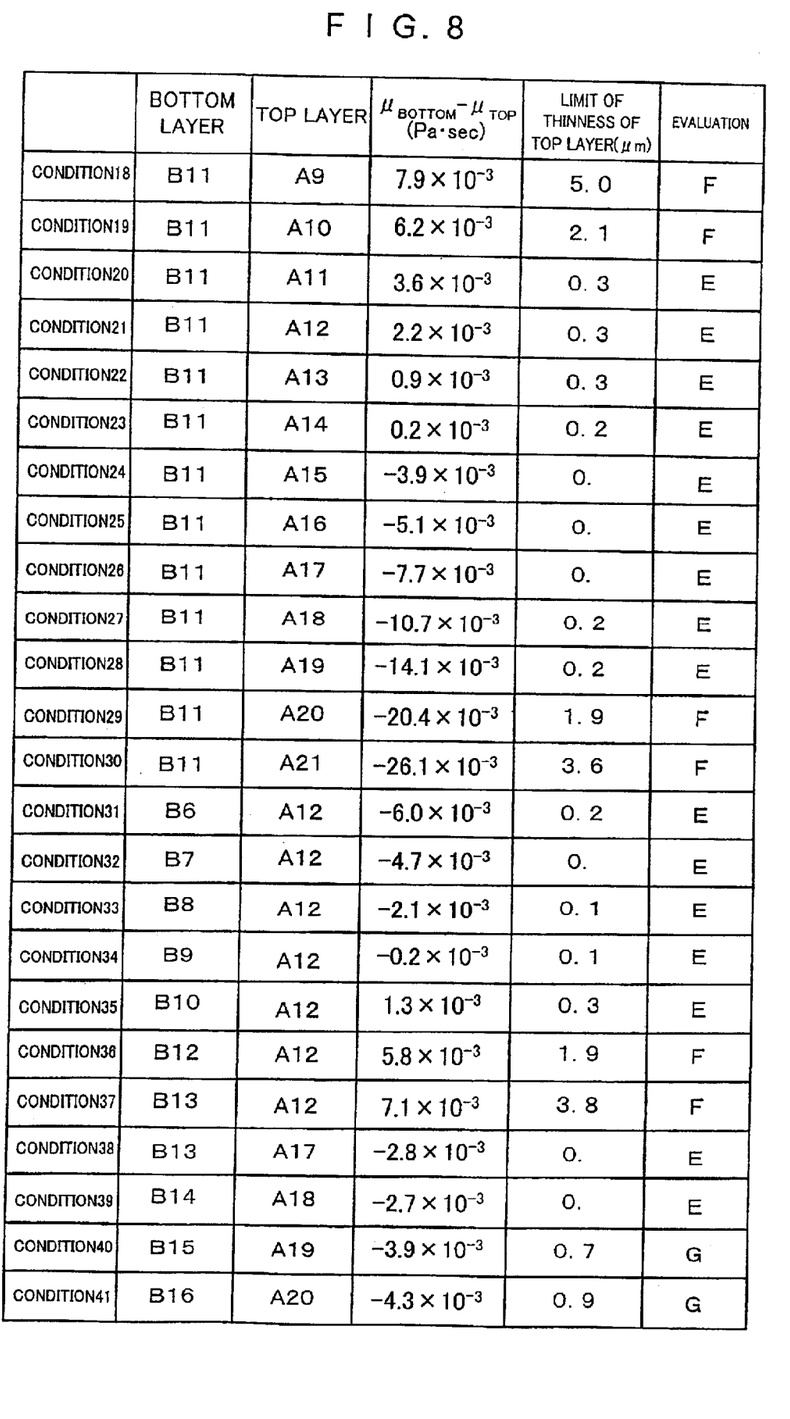
FIG. 8 is a table representing a result of the third example.

The coating conditions and the results of the evaluation are shown in FIG. 8, in which "Evaluation" means quality as a coated product. In FIG. 8, "E" (excellent) means that the limit of thinness of the top layer where the streaks of the equal pitch were about to occur was 0.5 $\mu$m or less (in the wet state), which was well below the target thinness of 1 $\mu$m (in the wet state), "G" (good) means that the target thinness of 1 $\mu$m (in the wet state) was able to be achieved, and "F" (failure) means that the target thinness of 1 $\mu$m (in the wet state) was not able to be achieved. "E" and "G" are acceptable quality. "0." in "Limit of Thinness of Top Layer" in FIG. 8 means that the streaks with the equal pitch did not occur even when an amount of flowing liquid reached to zero while successively reducing a supplying amount of the coating liquid for the top layer.

As seen from FIG. 8, the coated products had acceptable quality in the following experimental sections, Condition 20 (difference in viscosity=3.6×10$^{-3}$), Condition 21 (difference in viscosity=2.2×10$_{-3}$), Condition 22 (difference in viscosity=0.9×10$_{-3}$), Condition 23 (difference in viscosity= 0.2×10$^{31}$ $^3$), Condition 24 (difference in viscosity=3.9×10$^-$$_3$), Condition 25 (difference in viscosity=−5.1×10$^{-3}$), Condition 26 (difference in viscosity=−7.7×10$^{-3}$), Condition 27 (difference in viscosity=−10.7×10$^{-3}$), Condition 28 (difference in viscosity=−14.1×10$^{-3}$), Condition 31 (difference in viscosity=−6.0×10$^{-3}$), Condition 32 (difference in viscosity=−4.7×10$^{-3}$), Condition 33 (difference in viscosity=−2.1×10$^{-3}$), Condition 34 (difference in viscosity=−0.2×10$^{-3}$), Condition 35 (difference in viscosity=1.3×10$^{-3}$), Condition 38 (difference in viscosity=−2.8×10$^{-3}$), Condition 39 (difference in viscosity=−2.7×10$^{-3}$), Condition 40 (difference in viscosity=−3.9×10$^{-3}$), and Condition 41 (difference in viscosity=−4.3×10$^{-3}$) in which the difference in viscosity of the coating liquids for the bottom layer and the top layer satisfied "the viscosity difference condition of the present invention" at the time of applying the high shearing. Results of the conditions were all "E" where the top layer can be very thin as 0.5 $\mu$m or less except Conditions 40 and 41, which were "G".

In contrast, in the experimental sections Condition 29 (viscosity difference=−20.4×10$^{-3}$) and Condition 30 (viscosity difference=−26.1×10$^{-3}$), the viscosity difference of the coating liquids forming the bottom layer and the top layer at the time of applying the high shearing was less than −15.0×10$^{-3}$ (Pa·s), which is the lower limit of "the viscosity difference condition of the present invention". In Conditions 29 and 30, the limits of thinness of top layer where the streaks with the equal pitch occurred were 1.9 $\mu$m and 3.6 $\mu$m, respectively, and the top layer was not able to be made thin as to 1 $\mu$m or less. In the experimental sections Condition 18 (viscosity difference=7.9×10$^{-3}$), Condition 19 (viscosity difference=6.2×10$^{-3}$), Condition 36 (viscosity difference=5.8×10$^{-3}$), and Condition 37 (viscosity difference=7.1×10$^{-3}$), the viscosity difference of the coating liquids forming the bottom layer and the top layer at the time of applying the high shearing was over 5.0×10$^{-3}$ (Pa·s), which is the upper limit of "the viscosity difference condition of the present invention". In Conditions 18, 19, 36, and 37, the limits of thinness of top layer where the streaks with the equal pitch occurred were 5.0 $\mu$m, 2.1 $\mu$m, 1.9 $\mu$m, and 3.8 $\mu$m, respectively; thus the top layer was not able to be made thin as 1 $\mu$m or less in the wet state.

Example 4

The coating apparatus in FIG. 3 provided with the single coating head with three slits was used, and the coating apparatus applied three layers (bottom, middle, and top layers) at the coating speed 200 m/minute on the web made of polyethylene terephthalate of the thickness 5.5 μm. The thickness of the bottom layer was fixed at 61 μm (in the wet state) by using the coating liquid B11, and at the same time the thickness of the middle layer was fixed at 2 μm (in the wet state) by using the coating liquid A14, while the top layer was gradually made thinner. A relationship was evaluated between the thickness of the top layer (in the wet state) where the streaks of the equal pitch were about to occur and the difference in viscosity of the coating liquids forming the middle layer and the bottom layer.

Figure 9:
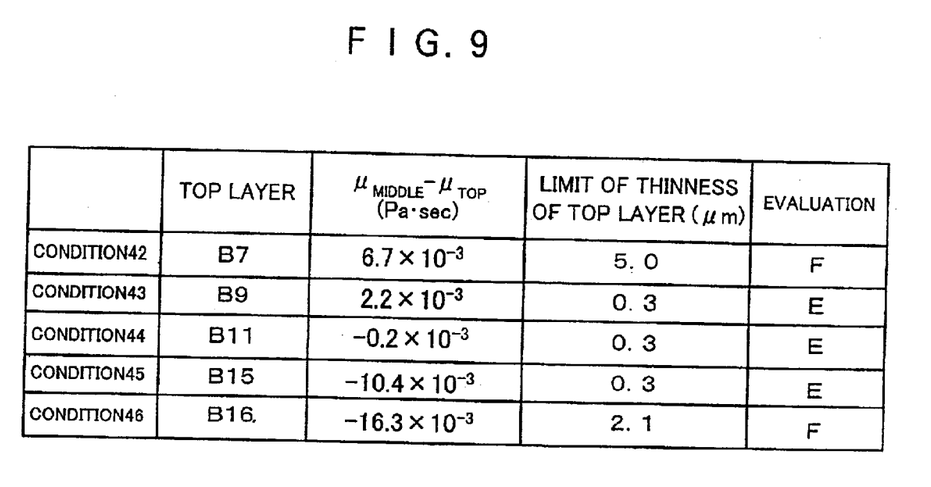
FIG. 9 is a table representing a result of the fourth example.

The coating conditions and the results of the evaluation are shown in FIG. 9, where the symbols "E" and "F" have the same meanings as in FIG. 8.

As seen from FIG. 9, the coated products had acceptable quality and the top layer was able to be very thin as to 0.5 μm or less in coating with the three layers in the following experimental sections, Condition 43 (difference in viscosity=$2.2 \times 10^{-3}$), Condition 44 (difference in viscosity=$-0.2 \times 10^{-3}$), and Condition 45 (difference in viscosity=$-10.4 \times 10^{-3}$), in which the difference in viscosity of the coating liquids for the middle layer and the top layer satisfied "the viscosity difference condition of the present invention" at the time of applying the high shearing.

In contrast, in the experimental section Condition 46 (viscosity difference=$-16.3 \times 10^{-3}$), the viscosity difference of the coating liquids forming the middle layer and the top layer at the time of applying the high shearing was less than $-15.0 \times 10^{-3}$ (Pa·s), which is the lower limit of "the viscosity difference condition of the present invention". In Condition 46, the limit of thinness of the top layer where the streaks with the equal pitch occurred was 2.1 μm (in the wet state), and the top layer was not able to be made thin as to 1 μm or less. In the experimental section Condition 42 (viscosity difference=$6.7 \times 10^{-3}$), the viscosity difference of the coating liquids forming the middle layer and the top layer at the time of applying the high shearing was over $5.0 \times 10^{-3}$ (Pa·s), which is the upper limit of "the viscosity difference condition of the present invention". In Condition 42, the limit of thinness of the top layer where the streaks with the equal pitch occurred was 5.0 μm, and the top layer was not able to be made thin as to 1 μm or less.

Example 5

The coating apparatus in FIG. 3 provided with the single coating head with three slits was used, and the coating apparatus applied three layers (bottom, middle, and top layers) at the coating speed 100 m/minute on the web made of polyamide of the thickness 3.5 μm. The thickness of the bottom layer was fixed at 6 μm (in the wet state) by using the coating liquid B11 or B12, and at the same time the thickness of the top layer was fixed at 1 μm (in the wet state) by using the coating liquid A17, while the middle layer was gradually made thinner. A relationship was evaluated among the thickness of the middle layer (in the wet state) where the streaks of the equal pitch were about to occur, the difference in viscosity (called the first viscosity difference) of the coating liquids forming the bottom layer and the middle layer at the time of applying the high shearing, and the difference in viscosity (called the second viscosity difference) of the coating liquids forming the middle layer and the top layer at the time of applying the high shearing.

Figure 10:
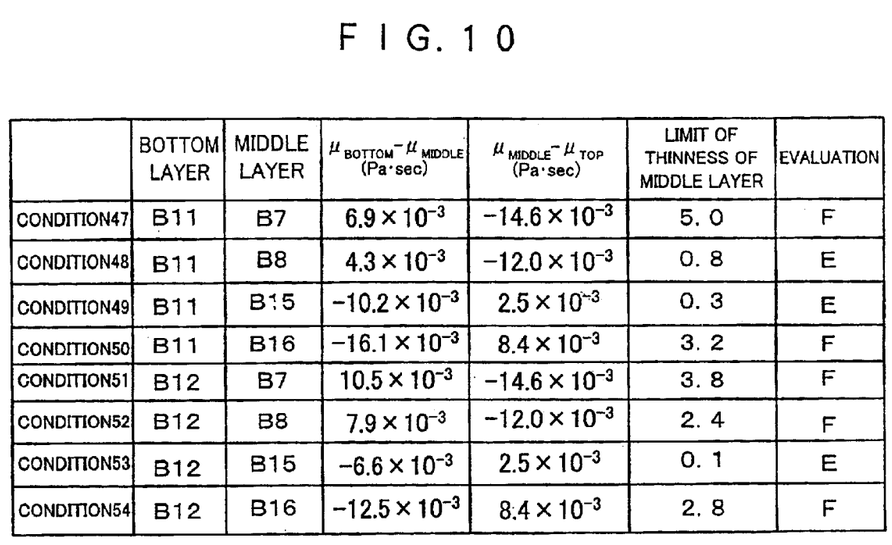
FIG. 10 is a table representing a result of the fifth example.

The coating conditions and the results of the evaluation are shown in FIG. 10, where the symbols "E" and "F" have the same meanings as in FIG. 8.

As seen from FIG. 10, the coated products had acceptable quality in the following experimental sections, Condition 48 (the first viscosity difference=$4.3 \times 10^{-3}$, and the second viscosity difference=$-12.0 \times 10^{-3}$), Condition 49 (the first viscosity difference=$-10.2 \times 10^{-3}$, and the second viscosity difference=$2.5 \times 10^{-3}$), and Condition 53 (the first viscosity difference=$-6.6 \times 10^{-3}$, and the second viscosity difference=$2.5 \times 10^{-3}$) in which both the first viscosity difference and the second viscosity difference satisfy "the viscosity difference condition of the present invention". In a case of making the middle layer thinner in the three layer coating, the middle layer was able to be made thin as to 1.0 μm or less by using the coating method of the present invention.

In contrast, in the experimental sections Condition 47 (the first viscosity difference=$6.9 \times 10^{-3}$, and the second viscosity difference=$-14.6 \times 10^{-3}$), Condition 51 (the first viscosity difference=$10.5 \times 10^{-3}$, and the second viscosity difference=$-14.6 \times 10^{-3}$), and Condition 52 (the first viscosity difference=$7.9 \times 10^{-3}$, and the second viscosity difference=$-12.0 \times 10^{-3}$) where the second viscosity difference satisfied "the viscosity difference condition of the present invention" but the first viscosity did not, the limits of thinness of the middle layer (in the wet state) where the streaks with the equal pitch were about to occur were 5.0 μm, 3.8 μm, and 2.4 μm, respectively; and the middle layer was not able to be made thin as to 1 μm or less. In Condition 54 (the first viscosity difference=$-12.5 \times 10^{-3}$, and the second viscosity difference=$8.4 \times 10^{-3}$) in which the first viscosity difference satisfied "the viscosity difference condition of the present invention" but the second viscosity difference did not, the limit of thinness of the middle layer (in the wet state) where the streaks with the equal pitch were about to occur was 2.8 μm; and the middle layer was not able to be made thin as to 1.0 μm or less in the wet state. Furthermore, in Condition 50 (the first viscosity difference=$-16.1 \times 10^{-3}$, and the second viscosity difference=$8.4 \times 10^{-3}$) in which neither the first viscosity difference nor the second viscosity difference satisfies "the viscosity difference condition of the present invention", the limit of thinness of the middle layer (in the wet state) where the streaks with the equal pitch were about to occur was 3.2 μm; and the middle layer was not able to be made thin as to 1.0 μm or less in the wet state.

As described above, the coated product which is manufactured by the coating method according to the present invention can make at least one of the layers except the bottom layer thin as to 1.0 μm or less in the wet state.

In the embodiments of the present invention, examples are presented in which the coating apparatus is used that is provided with the single coating head with two or three slits. However, the same effect can be achieved with a coating apparatus that discharges coating liquids from respective slits of a plurality of coating heads, and applies multiple layers by applying other layers while the coating liquid is wet, or another coating apparatus that discharges a coating liquid for the bottom layer from a slit for the coating liquid for the bottom layer which is positioned at upstream of running web so as to form the bottom layer on the coated surface of the web beforehand, and discharges the coating liquids for the middle layer and the top layer from the slits for the coating liquids for the middle layer and the top layer, respectively, so as to apply the middle layer and the top layer on the bottom layer while removing a part of the bottom layer in the wet state by a front edge part at downstream.

As described above, according to the coating method of the present invention, the streaks with the equal pitch can be prevented from occurring on the surface of the coating layer even though thin multiple coating layers, particularly the layers applied to have thickness of 2.0 μm or less, or preferably 1.0 μm or less in the wet state are formed in the high speed application. Therefore, not only the coating capability but also the quality of the coated products can be improved, resulting in improvement of the productivity.

Furthermore, according to the present invention, the thickness of the layer of coated product in at least one of the multiple coating layers except the bottom layer can be as thin as 2.0 μm or less, or preferably 1.0 μm or less in the wet state; therefore, if the coating layer is the magnetic recording layer, for example, the magnetic recording medium as the coated product can be dramatically improved.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A coating method in which a web which continuously runs is relatively pressed against an edge face of a coating head and a plurality of shear thinning coating liquids are discharged from a plurality of slits formed in the edge face in a direction of width of said web so that layers of the plurality of coating liquids are applied on the web in a wet-on-wet condition, wherein:

viscosities of the plurality of coating liquids are adjusted so that a following inequality is satisfied, $$-15 \times 10^{-3} < \mu_{n-1} - \mu_n < 5 \times 10^{-3},$$

where $\mu_n$ (Pa·s) is a high shear viscosity of the coating liquid forming an n-th (n≧2) layer from said web and $\mu_{n-1}$ (Pa·s) is a high shear viscosity of the coating liquid forming an (n−1)-th layer that is adjacent to the n-th layer;

wherein a thickness of a top layer is 1 μm in a wet state; and wherein the top layer of the coating liquid is applied on the web without removing a part of a bottom layer of the coating liquid having been applied.

2. The coating method as defined in claim 1, wherein a viscosity of the coating liquid for the bottom layer is adjusted so that a following inequality is satisfied, $$\mu_1 < 20 \times 10^{-3},$$

where $\mu_1$ (Pa·s) is a high shear viscosity of the coating liquid forming the bottom layer that contacts with said web.

* * * * *